United States Patent [19]

Demel

[11] Patent Number: 5,313,922
[45] Date of Patent: May 24, 1994

[54] METHOD FOR CONTROLLING A FLOW OF FUEL TO AN ENGINE OF A VEHICLE DURING OVERRUN OPERATION

[75] Inventor: Herbert Demel, Bad Wimpfen, Fed. Rep. of Germany

[73] Assignee: Robert Bosch GmbH, Stuttgart, Fed. Rep. of Germany

[21] Appl. No.: 522

[22] Filed: Jan. 5, 1993

Related U.S. Application Data

[63] Continuation of Ser. No. 839,036, Feb. 18, 1992, abandoned, which is a continuation of Ser. No. 623,193, Dec. 6, 1990, abandoned.

[30] Foreign Application Priority Data

Dec. 23, 1989 [DE] Fed. Rep. of Germany ....... 3942862

[51] Int. Cl.$^5$ ............................................. F02D 33/00
[52] U.S. Cl. ................................................... 123/333
[58] Field of Search ............... 123/333, 325, 336, 493; 364/431.09, 426.02; 180/197

[56] References Cited

U.S. PATENT DOCUMENTS

| | | | |
|---|---|---|---|
| 3,463,130 | 8/1969 | Reichardt et al. | 123/32 |
| 3,802,528 | 4/1970 | Leiber | 180/82 |
| 3,898,963 | 8/1975 | Iwata et al. | 123/32 |
| 4,432,430 | 2/1984 | Lind et al. | 180/197 |
| 4,440,127 | 4/1984 | Virgilio | 123/325 |
| 4,491,115 | 1/1985 | Otobe et al. | 123/493 |
| 4,539,643 | 9/1985 | Suzuki et al. | 364/431.09 |
| 4,558,672 | 12/1985 | Boccadoro et al. | 123/325 |
| 4,572,126 | 2/1986 | Arnold et al. | 123/325 |
| 4,598,679 | 7/1986 | Ohkuno et al. | 123/325 |
| 4,682,667 | 7/1987 | Hosaka | 180/197 |
| 4,700,673 | 10/1987 | Denz | 123/325 |
| 4,721,176 | 1/1988 | Kabasin et al. | 123/333 |
| 4,779,202 | 10/1988 | Leiber | 364/426.03 |
| 4,860,849 | 8/1989 | Andersson et al. | 180/197 |
| 4,870,933 | 10/1989 | Mizuno | 123/325 |
| 4,870,934 | 10/1989 | Vanatta et al. | 123/336 |
| 4,886,140 | 12/1989 | Leiber et al. | 123/333 |
| 4,917,208 | 4/1990 | Komoda | 180/197 |
| 4,933,856 | 6/1990 | Leiber | 364/426.01 |
| 4,941,441 | 7/1990 | Watanabe | 123/325 |
| 4,951,773 | 8/1990 | Poirier et al. | 123/333 |
| 5,046,009 | 9/1991 | Abo et al. | 364/426.02 |
| 5,094,206 | 3/1992 | Buslepp et al. | 123/325 |
| 5,099,942 | 3/1992 | Kushi et al. | 123/333 |

FOREIGN PATENT DOCUMENTS

| | | | |
|---|---|---|---|
| 0104539 | 9/1983 | European Pat. Off. | F02D 5/02 |
| 1974365 | 12/1967 | Fed. Rep. of Germany | 46B/19/01 |
| 1981032 | 3/1968 | Fed. Rep. of Germany | 46B/19/01 |
| 3137161 | 3/1983 | Fed. Rep. of Germany | F02D 17/04 |
| 3235619 | 3/1984 | Fed. Rep. of Germany | B60K 28/00 |
| 3328219 | 2/1985 | Fed. Rep. of Germany | B60K 28/00 |
| 3513656 | 10/1985 | Fed. Rep. of Germany | F02D 41/12 |
| 3705983 | 9/1987 | Fed. Rep. of Germany | B60T 8/32 |
| 3630563 | 10/1988 | Fed. Rep. of Germany | F02D 41/32 |
| 3737697 | 5/1989 | Fed. Rep. of Germany | B60K 28/16 |
| 3836713 | 5/1989 | Fed. Rep. of Germany | B60K 28/16 |
| 63-55337 | 3/1988 | Japan | F02D 41/12 |
| 63-57838 | 3/1988 | Japan | F02D 41/12 |
| 89/04782 | 6/1989 | PCT Int'l Appl. | B60T 8/24 |
| 89/08776 | 9/1989 | PCT Int'l Appl. | F02D 41/12 |

OTHER PUBLICATIONS

DE-Z: Neues aus der Kraftfahrzeugtechnik. In: ATZ 70, H.10, 1968, S.369.3.

Primary Examiner—Raymond A. Nelli
Attorney, Agent, or Firm—Kenyon & Kenyon

[57] ABSTRACT

A method for limiting the "braking" force exerted by a gasoline internal combustion engine on the driving wheels of a motor vehicle attains a high degree of driving safety. The flow of fuel to the engine is controlled during overrun operation of the vehicle in order to reduce the braking force based upon at least one variable indicative of the operating conditions of the vehicle.

11 Claims, 3 Drawing Sheets

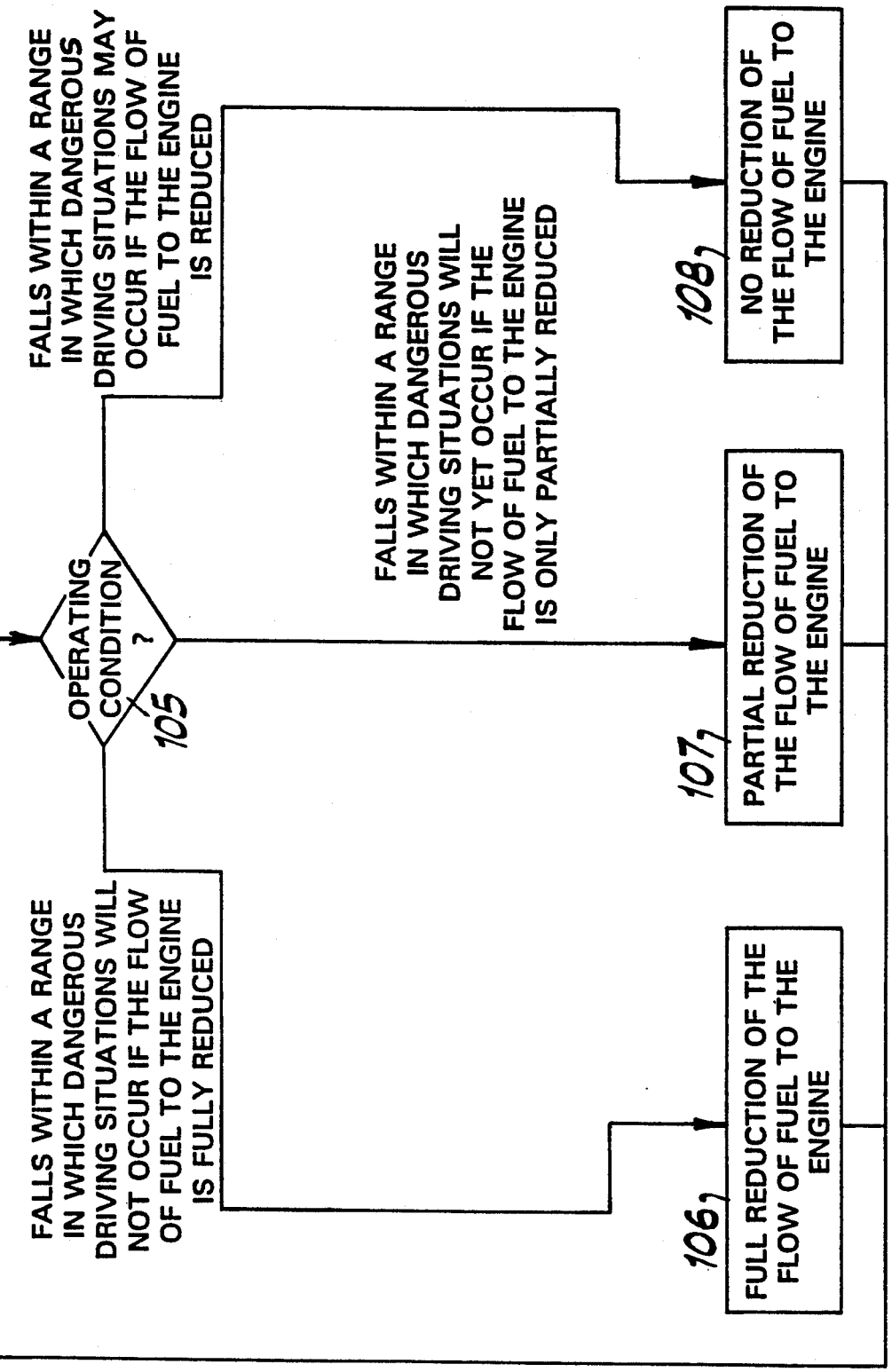

METHOD FOR CONTROLLING A FLOW OF FUEL TO AN ENGINE OF A VEHICLE DURING OVERRUN OPERATION

This is a continuation of application Ser. No. 07/839,036 filed on Feb. 18, 1992, which is a continuation of application Ser. No. 07/623,193 filed on Dec. 6, 1990, now both abandoned.

FIELD OF THE INVENTION

The present invention relates to a method for controlling the flow of fuel to a gasoline internal combustion engine of a motor vehicle.

BACKGROUND INFORMATION

In fuel injection and modern carburetor systems in internal combustion engines, it is advantageous to block the supply of fuel to the engine during overrun operation of the vehicle in order to reduce fuel consumption and pollutant emissions. The vehicle is in overrun operation when the throttle valve is substantially closed (i.e., the accelerator pedal is in an idle position) and the instantaneous rotational speed of the engine is greater than a predetermined threshold value.

German Published Patent Application No. 32 10 512 shows a system in which the fuel supply to the engine is blocked only above a certain temperature. The measured temperature is the temperature of the engine intake air and/or the temperature of the surroundings of the engine. The system is based on the assumption that low temperatures can be indicative of snow and ice-covered roadways. In low temperatures, the reduction in rotational speed of the engine caused by the blockage of fuel can be disadvantageous, because the relatively large ("braking") force exerted on the vehicle's driving wheel(s) by the engine, which results from the reduced rotational speed of the engine, resists rotation of the vehicle's driving wheel(s) and, hence, increases the danger of sliding or skidding.

One disadvantageous of this system, however, is that because the cutting-off (limiting) of the flow of fuel to the engine during overrun operation of the vehicle takes place only during the warm seasons, which can be a considerable time period during the year, there is a corresponding increase in fuel consumption.

German Patent No. DE-OS 38 08 692 shows a system in which the braking moment is limited during thrust which the injection of fuel to the engine is controlled as a function of engine speed and time, in order to limit the braking force, during overrun operation, to a value which is sufficiently low to ensure that the driving wheels will not be locked. A plot of the fuel injection quantity as a function of time has a ramp shape, which may be influenced by parameters indicative of the operating condition of the engine, such as engine temperature, engine speed, and the gear in which the vehicle is operating.

A method for recognizing whether the vehicle is moving along a substantially straight or curved path ("curved path recognition") is described in International Patent Application No. WO 89/04782. The differences between velocity signals from diagonally opposite wheels, and signals indicative of the time variation of these differences are generated. If one of these signals exceeds a specified threshold value, then a curved path recognition signal is emitted.

It is an object of the present invention to overcome the problems and disadvantages of known methods for controlling the flow of fuel to the engine during overrun operation.

SUMMARY OF THE INVENTION

One advantage of the method of the present invention is that the limiting of the flow of fuel to the engine during overrun operation is based upon at least one of several variables indicative of the current operating condition of the vehicle. As such, it is possible to control the flow of fuel to the engine during overrun operation such that the vehicle is within an operating range in which dangerous driving situations, such as sliding or skidding, will not occur. Moreover, a minimum fuel supply is always guaranteed in order to ensure that dangerous driving situations do not occur, and, thus, in order to ensure driving safety. If the variables indicate that dangerous driving situations may occur if the flow of fuel to the engine is limited, such a limiting of the flow of fuel to the engine is not permitted.

In accordance with a method of the present invention the variables indicative of the current operating condition of the vehicle to be processed are selected from a group including: the traveling speed, and/or the engine speed, and/or the gear setting, and/or a recognition of whether the vehicle is moving along a substantially straight or curved path, and/or a transverse acceleration recognition, and/or a recognition of the friction coefficient of the tires, and/or a recognition of slippage of the tires, particularly the driving wheel tires.

One advantage of the present invention is that as a result of the curved path/transverse acceleration recognition, it is possible to further take into consideration the coefficients of friction present in such driving situations and, thus, limit the flow of fuel to the engine as much as possible such that dangerous driving situations will not yet occur. This applies similarly to situations in which the vehicle is moving along a straight path, in which case the braking force exerted by the engine on the vehicle's driving wheels may be different than the braking force exerted when the vehicle is moving along a curved path.

In a method of the present invention, this braking force is reduced by limiting the flow of fuel to the engine during overrun operation of the vehicle. To slowly reduce this braking force, a limiting of a flow of fuel to a single cylinder takes place.

In a method of the present invention, to reduce the braking force during overrun operation of the vehicle, the limiting of the flow of fuel to the engine is also based on whether the vehicle is a front wheel drive, a rear engine drive, rear wheel drive, or a four wheel drive model.

Whether the vehicle is moving in a substantially straight or curved path is a variable which is largely indicative of the current operating condition of the vehicle, and can be detected by means of a steering angle sensor. However, it can also be detected by using appropriate sensors mounted on the wheels of the vehicle. The curved path recognition is preferably linked to the recognition of a friction coefficient of the tires of the vehicle. Furthermore, in accordance with the present invention, the curved driving recognition can be considered in combination with a rise in the rotational speed of the engine to the "normal" idling speed of the engine. The flow of fuel to the engine is controlled during overrun operation of the vehicle in order to reduce, either continuously or gradually, the braking force while the rotational speed of the engine rises to the "normal" idling speed of the engine.

In evaluating the operating condition of the vehicle in accordance with the present invention, preferably the position of the accelerator pedal of the vehicle is first detected, and then it is determined whether the vehicle is moving along a straight or curved path. The braking force is also detected based on the engine speed and the gear setting of the gear unit of the vehicle.

In accordance with the present invention, a determination of the coefficient of friction, and/or sensing of the slippage of the driving wheels, and/or a consideration of whether the vehicle is a front wheel drive, a rear engine drive, a rear wheel drive, or a four wheel drive model are performed. Based on an evaluation of the variables indicative of the current operating condition of the vehicle, a full reduction of the flow of fuel to the engine is permitted if the operating condition of the vehicle falls within a range in which dangerous driving situations will not occur if the flow of fuel to the engine is full reduced; only a continuous or gradual reduction of the flow of fuel to the engine is permitted if the operating condition of the vehicle falls within a range in which dangerous driving situations will not yet occur if the flow of fuel to the engine is only continuously or gradually reduced; and no reduction of the flow of fuel to the engine is permitted if the operating condition of the vehicle falls within a range in which dangerous driving situations may occur if the flow of fuel to the engine is reduced.

Thus, one advantage of the present invention is that it enables driving safety to be considerably improved in an operating condition range of the vehicle in which dangerous driving situations will not yet occur if the flow of fuel to the engine is only continuously or gradually reduced, while incurring only a small additional cost.

BRIEF DESCRIPTION OF THE DRAWINGS

FIG. 1A and 1B are a functional flow diagram of the method of controlling the flow of fuel to a gasoline internal combustion engine during overrun operation of a motor vehicle, in order to reduce the braking force exerted by the engine on the vehicle wheels, according to the present invention.

DETAILED DESCRIPTION

In accordance with the method of the present invention, variables indicative of the operating condition of a motor vehicle are detected and evaluated. Referring to the functional flow diagram of FIG. 1, the starting point of the method is process step 101, in which the position of the accelerator pedal of the vehicle (not shown) is detected. The prerequisite for controlling (limiting) the flow of fuel to the engine, in order to reduce the braking force, during overrun operation is to detect that the accelerator pedal is in, or has returned to, the idle position, as indicted in step 101.

The variables indicative of the operating condition of the vehicle are then determined and evaluated. In particular, in step 102, it is determined whether the vehicle is moving along a substantially straight or curved path. One way of doings so is to evaluate the angle of the steering wheel. This curved path recognition can also be based on a comparison of the wheel speeds of the vehicle. The travelling speed of the vehicle can also be used. Another way of determining whether the vehicle is moving along a substantially straight or curved path is to detect the transverse acceleration of the vehicle, such as through the use of a transverse acceleration detector.

Figure 1A:
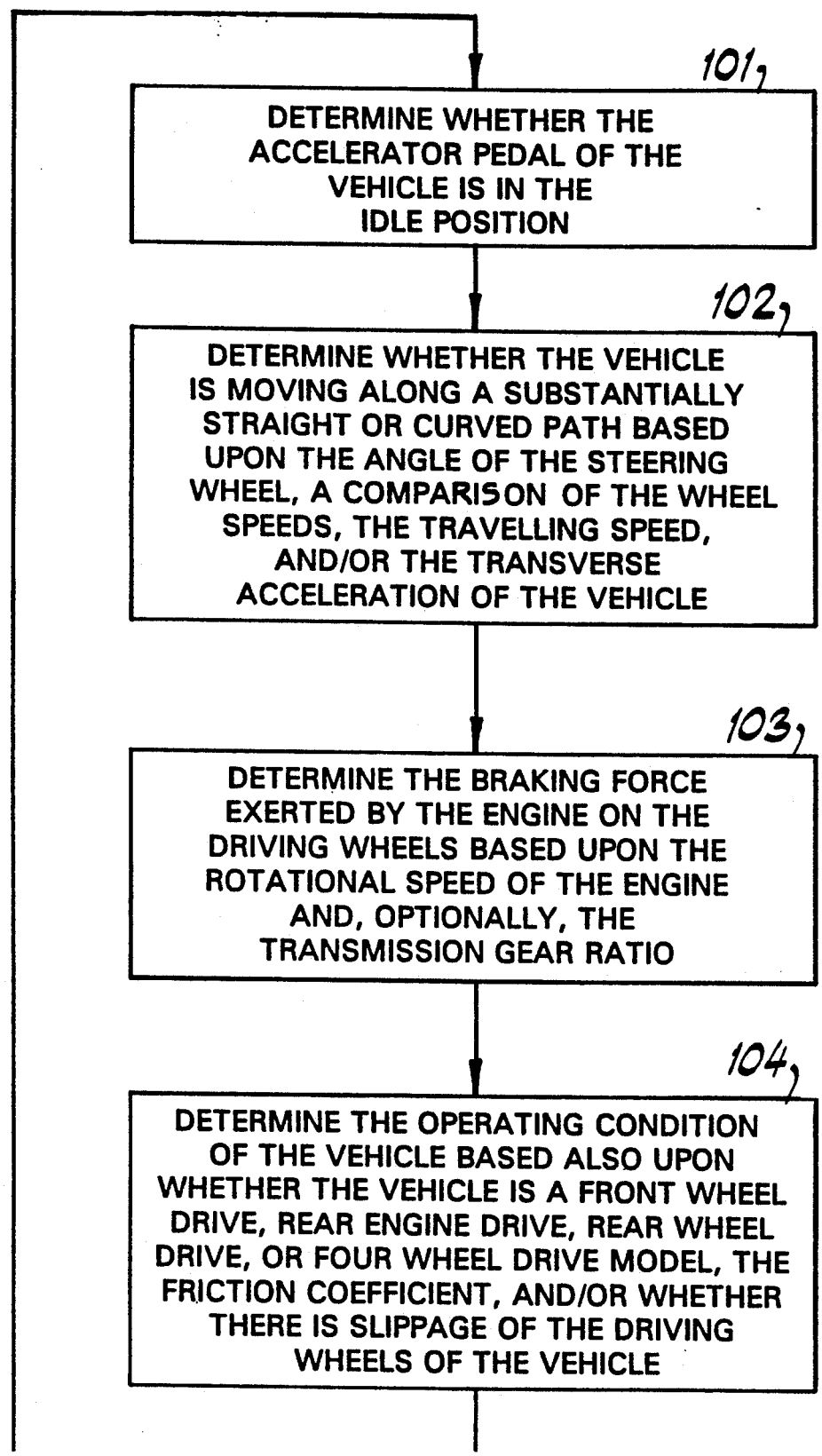

The braking force exerted by the engine on the vehicle's driving wheels is determined in step 103 of FIG. 1 based upon a determined instantaneous rotational speed of the engine $n_{mot}$ and, optionally, a transmission gear ratio. The transmission gear ratio is determined by sensing the gear setting of the vehicle transmission. Operating parameters of the engine, such as coolant temperature and/or oil temperature, can also be evaluated to determine the braking force.

In step 104, the operating condition of the vehicle is determined during overrun operation, in accordance with the method of the present invention. In addition to the variables indicative of the operating condition of the vehicle that are evaluated as discussed above, the operating condition of the vehicle is determined based also upon whether the vehicle is a front wheel drive, rear engine drive, rear wheel drive, or four wheel drive model. The operating condition of the vehicle may also be based upon the value of the coefficient of friction between the tires of the vehicles and the road surface, and/or whether there is slippage of the driving wheels of the vehicle, as indicated in step 104.

The determined operating condition of the vehicle is evaluated at step 105. If the determined operating condition of the vehicle falls within a range in which dangerous driving situations will not occur if the flow of fuel to the engine is fully reduced, as indicated in step 106, a full reduction of the flow of fuel to the engine is performed. If the determined operating condition of the vehicle falls within a range in which dangerous driving situations will not yet occur if the flow of fuel to the engine is only partially or gradually reduced, as indicated in step 107, only a partial or gradual reduction of the flow of fuel to the engine is performed, for example through the use of sequential fuel injection and, thus, single-cylinder fuel reduction. If the determined operating condition of the vehicle falls within a range in which dangerous driving situations may occur if the flow of fuel to the engine is reduced, as indicated in step 108, the flow of fuel to the engine is not reduced at all.

The method of the present invention thus makes it possible to significantly improve driving safety, while nevertheless considerably economizing fuel and reducing pollutant emissions. A particular advantage of the present invention, however, is that it provides an inexpensive solution to preventing dangerous driving situations during overrun operation of motor vehicles.

Figure 2:
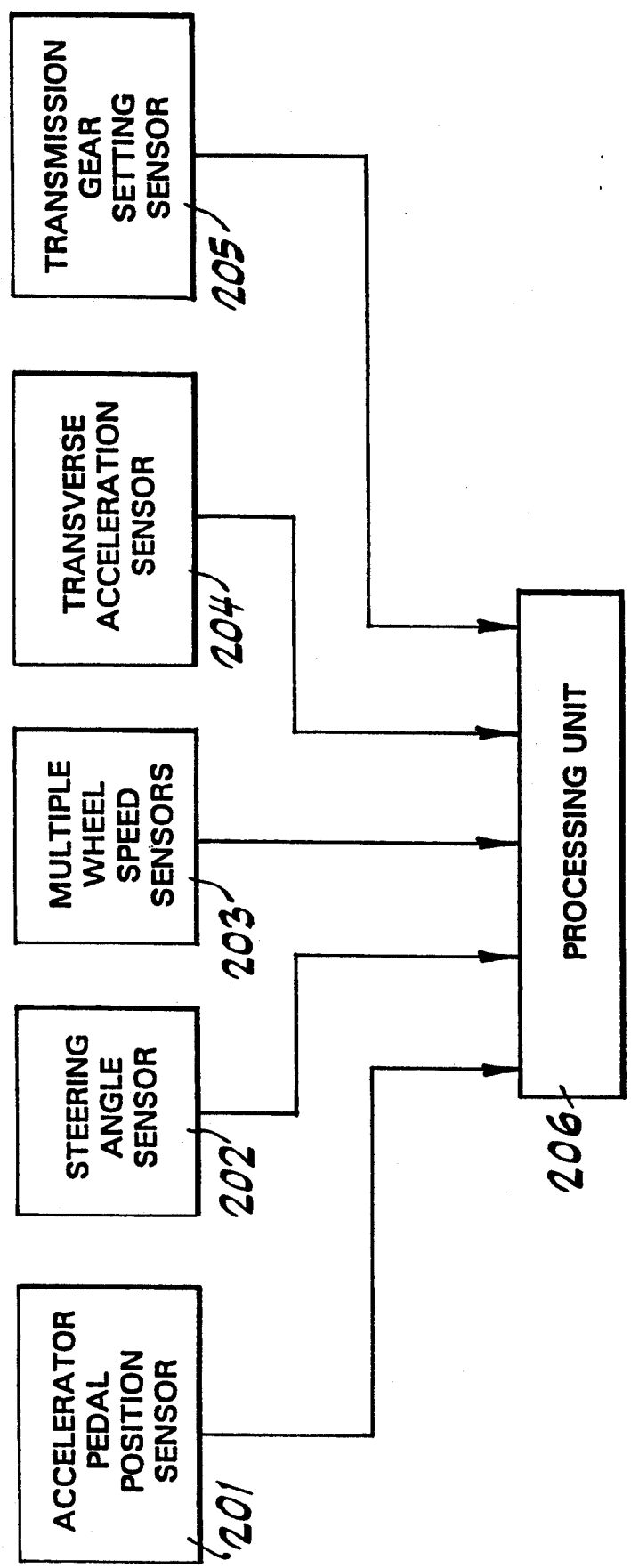
FIG. 2 is an exemplary block diagram of the sensors and the processing unit used to perform the method illustrated in FIG. 1.

FIG. 2 is a block diagram showing various sensors 201, 202, 203, 204, 205 of a motor vehicle which may be used to detect several of the variables indicative of the operating condition of the vehicle. FIG. 2 also shows a processing unit 206 which is used to evaluate the variables detected by the sensors 201, 202, 203, 204, 205, in accordance with the method of the present invention.

I claim:

1. A method of controlling a flow of fuel to an internal combustion engine of a vehicle, comprising the steps of:

determining whether an accelerator pedal of the vehicle is in an idle position;

determining whether a rotational speed of the engine is greater than a predetermined threshold value;

determining whether the vehicle is moving along a substantially straight or curved path by sensing, for example, at least one of an angle of a steering wheel of the vehicle, speeds of vehicle wheels, and a transverse acceleration of the vehicle;

determining whether the vehicle is in overrun operation as a function of whether the accelerator pedal of the vehicle is in the idle position and of whether the rotational speed of the engine is greater than the predetermined threshold value; and controlling the flow of fuel to the engine, during overrun operation of the vehicle, as a function of whether the vehicle is moving along a substantially straight or curved path.

2. The method according to claim 1, further comprising the step of determining a braking force exerted by the engine on driving wheels of the vehicle.

3. The method according to claim 2, wherein the determination of the braking force is based upon the rotational speed of the engine and a transmission gear ratio.

4. The method according to claim 2, further comprising the step of determining an operating condition of the engine as a function of whether the vehicle is moving along a substantially straight or curved path, the braking force, and whether the vehicle is a front wheel drive, rear wheel drive or four wheel drive model, and wherein the flow of fuel to the engine is controlled as a function of the determined operating condition of the engine.

5. The method according to claim 4, wherein the determination of the operating condition of the engine is based also upon a coefficient of friction and slippage of the driving wheels of the vehicle.

6. The method according to claim 4, wherein:

if the determined operating condition of the vehicle falls within a first range in which dangerous driving situations will not occur if the flow of fuel to the engine is fully reduced, the flow of fuel to the engine is fully reduced;

if the determined operating condition of the vehicle falls within a second range in which dangerous driving situations will not yet occur if the flow of fuel to the engine is only partially reduced, the flow of fuel to the engine is partially reduced; and if the determined operating condition of the vehicle falls within a third range in which dangerous driving situations may occur if the flow of fuel to the engine is reduced, the flow of fuel to the engine is maintained.

7. A method of controlling a flow of fuel to an internal combustion engine of a vehicle, comprising the steps of:

determining whether an accelerator pedal of the vehicle is in an idle position;

if the accelerator pedal is in the idle position, determining whether the vehicle is moving along a substantially straight or curved path;

determining a braking force exerted by the engine on the driving wheels of the vehicle during a condition of overrun operation based upon a predetermined rotational speed of the engine;

determining an operating condition of the vehicle as a function whether the vehicle is moving along a substantially straight or curved path, the braking force, and whether the vehicle is a front wheel drive, rear wheel drive or four wheel drive model, and with respect to predefined first, second and third ranges of operating conditions, the first range indicating that dangerous driving situations will not occur if the flow of fuel to the engine is fully reduced, the second range indicating that dangerous driving situations will not yet occur if the flow of fuel to the engine is only partially reduced, and the third range indicating that dangerous driving situations may occur if the flow of fuel to the engine is reduced;

if the determined operating condition of the vehicle falls within the first range, fully reducing the flow of fuel to the engine;

if the determined operating condition of the vehicle falls within the second range, partially reducing the flow of fuel to the engine; and if the determined operating condition of the vehicle falls within the third range, maintaining the flow of fuel to the engine.

8. The method according to claim 7, wherein whether the vehicle is moving along a substantially straight or curved path is determined by sensing the angle of a steering wheel of the vehicle.

9. The method according to claim 7, wherein the determination of whether the vehicle is moving along a substantially straight or curved path is based upon at least one of an angle of a steering wheel of the vehicle, speeds of the wheels of the vehicle, a travelling speed of the vehicle, and a transverse acceleration of the vehicle.

10. The method according to claim 7, wherein the determination of the braking force is based also upon at least one of a transmission gear ratio, an engine coolant temperature, and an engine oil temperature.

11. The method according to claim 7, wherein the determination of the operating condition of the engine is based also upon a coefficient of friction and slippage of driving wheels of the vehicle.

* * * * *

UNITED STATES PATENT AND TRADEMARK OFFICE
CERTIFICATE OF CORRECTION

PATENT NO. : 5,313,922
DATED : MAY 24, 1994
INVENTOR(S) : DEMEL, H.

It is certified that error appears in the above-identified patent and that said Letters Patent is hereby corrected as shown below:

In column 1, line 49, delete "which the braking moment is limited during thrust";

Column 2, line 64, change "driving" to --path--.

Signed and Sealed this

Eleventh Day of April, 1995

Attest:

BRUCE LEHMAN

*Attesting Officer*        *Commissioner of Patents and Trademarks*